United States Patent [19]

Silverstein et al.

[11] Patent Number: 5,032,007

[45] Date of Patent: Jul. 16, 1991

[54] APPARATUS AND METHOD FOR AN ELECTRONICALLY CONTROLLED COLOR FILTER FOR USE IN INFORMATION DISPLAY APPLICATIONS

[75] Inventors: Louis D. Silverstein, Scottsdale; Anthony J. Bernot, Gilbert, both of Ariz.

[73] Assignee: Honeywell, Inc., Minneapolis, Minn.

[21] Appl. No.: 178,949

[22] Filed: Apr. 7, 1988

[51] Int. Cl.$^5$ .............................................. G02F 1/133
[52] U.S. Cl. .................................... 350/335; 350/349
[58] Field of Search ................................. 350/335, 349

[56] References Cited

U.S. PATENT DOCUMENTS

| | | | |
|---|---|---|---|
| 3,703,329 | 11/1972 | Castellano | 350/335 |
| 4,097,130 | 6/1978 | Cole, Jr. | 350/335 |
| 4,299,720 | 11/1981 | Osman et al. | 350/349 |
| 4,556,286 | 12/1985 | Uchida et al. | 350/335 |
| 4,671,617 | 6/1987 | Hara | 350/335 |
| 4,758,818 | 7/1988 | Vatne | 350/335 |
| 4,778,619 | 10/1988 | Wakemoto et al. | 350/349 |
| 4,838,655 | 6/1989 | Hunahata et al. | 350/349 |
| 4,886,343 | 12/1989 | Johnson | 350/335 |
| 4,917,465 | 4/1990 | Connor et al. | 350/335 |

Primary Examiner—Stanley D. Miller
Assistant Examiner—Anita Pellman Gross
Attorney, Agent, or Firm—John G. Shudy; Roger W. Jensen; William W. Holloway

[57] ABSTRACT

An electronic color filter system for controlling a picture element color signal includes three filter regions which selectively control spectral components of light transmitted sequentially therethrough. Each filter region has a liquid crystal host material and a dye guest component. The orientation of the liquid crystal host, determined by an electric field applied to the filter material, determines the absorption coefficient of the dye guest component to polarized light. By appropriate selection of the guest dye component and control of the electric fields applied to the host liquid crystal, the transmitted light can have a selected radiation spectrum. The transmitted light of a multiplicity of picture elements can be used to provide a full-color visual image display.

13 Claims, 6 Drawing Sheets

| CELL 1 (YELLOW) | OFF | OFF | ON | OFF |
| CELL 2 (CYAN) | ON | OFF | OFF | ON |
| CELL 3 (MAGENTA) | OFF | ON | OFF | ON |
| EMERGING LIGHT | RED | GREEN | BLUE | YELLOW |

OFF = ABSORBING

ON = TRANSMITTING

APPARATUS AND METHOD FOR AN ELECTRONICALLY CONTROLLED COLOR FILTER FOR USE IN INFORMATION DISPLAY APPLICATIONS

BACKGROUND OF THE INVENTION

1. Field of the Invention

The present invention relates generally to devices for the display of color information and, more particularly, to multi-color segmented or matrix type displays in which a finite number of discretely addressable picture elements (pixels) are activated in appropriate combination to form a full-color image.

2. Description of the Related Art

Previous segmented or matrix display technologies used for generating full-color alphanumeric, graphic and/or television type video images have relied on additive color synthesis via high-density arrangements of small red (R), green (G), and blue (B) primary color pixels.

Color encoding has become a common feature in visual information displays. Although many types of color display systems and applications presently exist, there are many other potentially useful applications of color which have not been developed due to limitations in existing color display technology. Virtually all existing color displays are additive color systems, in that full color is produced by either the spatial integration of very small primary color points (i.e., very small R, G, and B pixels) or the temporal integration of sequentially presented image fields of alternating primary colors.

Both of these additive approaches to color synthesis have significant limitations. Spatial additive color synthesis requires high pixel density or resolution, since the projected angle substended by of small primary color elements (i.e., R, G, and B pixels) must be encompassed within the spatial integration zones of the human visual system. If primary color elements are too large, then complete color synthesis will fail to occur and color fringes or patterns will be apparent in the image. The requirement for three "populations" of spatially separated primary color elements to produce a full-color image, as in the shadow-mask cathode ray tube, results in a reduction of available image sampling resolution of the display device. For applications requiring full color and very high image resolution, such as systems for the display of sensor video information, spatial additive approaches to color synthesis are generally not feasible due to the resultant losses in image sampling resolution. In addition, many applications for color information displays require only low image resolution, such as color-coded alphanumeric or symbolic displays. For low-resolution displays, spatial additive color technology is generally not appropriate since relatively high pixel resolution or density is required for adequate color synthesis even though image resolution requirements are substantially lower. High pixel density usually incurs high cost, and many potentially useful applications of color in low resolution displays remain undeveloped due to the relatively high cost of spatial additive color display technology.

Temporal color synthesis does not rely on three "populations" of spatially separated R, G, and B pixels to produce a full-color image, but rather achieves color synthesis by rapid sequential alternation of primary color images. This approach to color synthesis does not degrade image resolution, as does spatial color synthesis. Full color control is effectively achieved at each individual image pixel. Temporal synthesis is generally implemented by a broad-band image forming source passing light sequentially in time through three color filters (typically R, G, and B). The image forming source must be synchronized with the three color filters such that appropriate parts of the image with an intended color are displayed while the respective filter or filters are in front of the image forming source. The most popular implementations of such "frame-sequential" color display systems are typified by the use of a cathode ray tube with a broad-band phosphor (i.e., emitting white light) as the image forming source and a rotating color wheel containing R, G, and B filters as the color rendering component. More recently, the color wheel has been replaced by a non-mechanical component consisting essentially of a liquid crystal (LC) switchable optical polarizer and several layers of polarized color filter films.

The disadvantages of color display systems which utilize temporal color synthesis (i.e., frame-sequential color mixing) are rooted in the fact that, in such systems, the individual primary color image fields are separated in time and are only present for one third of the total display viewing period. Since three color image fields must be presented in the same amount of time as a single field in a spatial additive color display or a monochromatic display, frame-sequential displays require an extremely high system bandwidth in order to produce a full-color image at a refresh rate high enough to minimize observable flicker. Even with high system bandwidths and full-color refresh rates equivalent to monochromatic or spatial additive color displays (i.e., three times the refresh rates of non-frame-sequential displays), frame-sequential color displays are prone to image flicker due to the luminance modulation existing between sequential color image fields. A more important limitation of the temporal synthesis approach to color mixture, however, is that mixture colors are often observed to smear or separate into their individual primary color image components during motion of either the displayed image or the observer's eyes.

A need has therefore been felt for color display apparatus that overcomes the problems created by the use of additive techniques.

FEATURES OF THE INVENTION

It is an object of the present invention to provide an improved display apparatus.

It is a feature of the present invention to provide an improved liquid crystal display.

It is another feature of the present invention to provide a liquid crystal display in which transmitted radiation for each display pixel has spectral components subtracted in order to obtain a selected color signal.

It is yet another feature of the present invention in which a segmented color display has spectral components subtracted from transmitted radiation to provide the color functionality.

SUMMARY OF THE INVENTION

The aforementioned and other objects are accomplished, according to the present invention, by an electronically controlled color filter and several implementations of full-color information displays which incorporate this electronic color filter as a critical element. The unique and fundamental aspect of this color filter is the utilization of a subtractive method of color synthesis, rather than the spatial or temporal additive techniques which characterize existing switchable color filters and related color display technology. The basic elements of this subtractive color filter are three guest-/host liquid crystal cells each containing a different dichroic guest dye {typically magenta (−G), cyan (−R), and yellow (−B) dyes} and stacked in registration along with associated structural components and optical components (e.g. polarizers and/or fiber-optic plates). The cells can include patterned electrodes {and for some applications integral sample-and-hold features such as thin film transistors (TFTs) at individual pixels} when the device is configured as either a low- or high-resolution full-color display, or a uniform electrode layer when the device is configured as a simple electronic color filter. When the device is configured as a color display, only a broad-band source of illumination is required for full-color image presentation. In the simple electronic color filter configuration, the device is used in conjunction with a broad-band image forming source, such as a cathode ray tube with white-emitting phosphor or a back-lit patterned illuminator with broad-band lamp, and serves as a spectrally selective light valve which modifies the color of the transmitted image.

These and other features of the present invention will be understood upon reading of the following description along with the drawings.

BRIEF DESCRIPTION OF THE DRAWINGS

The rationale and preferred embodiment(s) of the present invention are illustrated in the attached drawings wherein.

DESCRIPTION OF THE PREFERRED EMBODIMENT

1. Detailed Description of the Figures

Figure 1A:
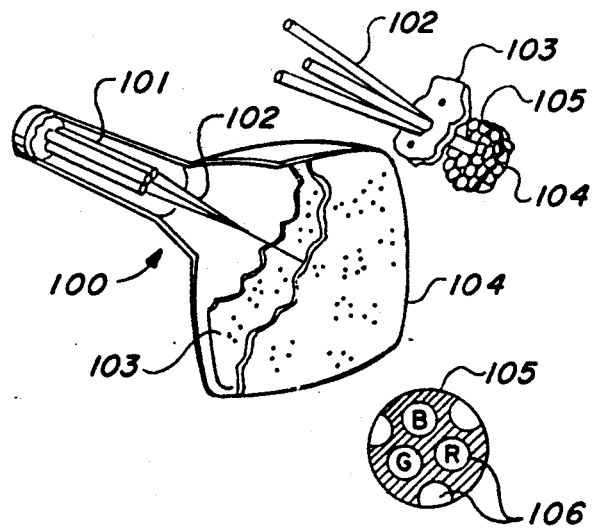
FIGS. 1A and 1B show two existing approaches for producing full-color images using the spatial-additive method of color synthesis: the shadow-mask color cathode ray tube (1A) and the active-matrix addressed liquid crystal display panel with R-G-B color filter array (1B).
Figure 1B:
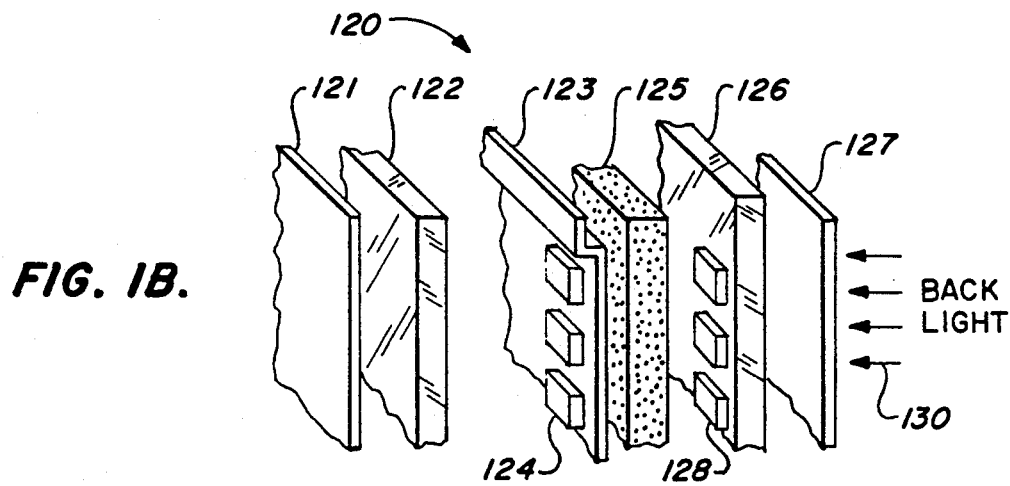

FIGS. 1A and 1B illustrate two commonplace embodiments of spatial-additive color information displays. Referring first to FIG. 1A, the typical shadow-mask cathode ray tube 100 such as is used in commercial color television receivers and which is the predominant device for color information display, is shown. Full color is achieved with the shadow-mask color cathode ray tube by the spatial integration of luminous emissions from closely-spaced R, G, and B phosphor dots 106, each of which is excited by an associated electron beam 102. The phosphor dots are positioned on the cathode ray tube face 104. The electron beams 102 are generated by a plurality of electron guns. The R, G and B phosphor dots 106 are arranged in pixel groups 105. The electron beams 102 exciting each phosphor dot of a pixel group 105 pass through an aperture associated with each pixel group 105 in the shadow mask 103. Note that the spatial integration of chromatic information is performed by the observer's eye and not the display device, thus requiring the display device to possess sufficient resolution such that the individual primary color elements are not individually resolvable by the eye of the observer.

Referring next to FIG. 1B, another full-color display device, which relies on spatial-additive color synthesis, is shown. This display is generally referred to as a active-matrix addressed liquid crystal color matrix display. While the basic principles of image formation and color mixture are the same as those used in the shadow-mask color cathode ray tube, the liquid crystal color matrix display 120 employs a liquid crystal material which serves as an electronically-controlled light valve at each picture element individually to gate incident light through a micro-layer of color filters (typically R, G, and B). Back light 130 is transmitted through polarizing material 127. The back light is then transmitted through the glass substrate 126 upon which are positioned thin film transistors 128. Liquid crystal material 125 is contained between glass substrate 126 and common (transparent) electrode 123. Associated with each thin film transistor 128 is a filter 124. The thin film transistor 128 controls the intensity of light transmitted through the associated filter 124. Three filters (R, G and B) 128 form an image pixel. The filtered light is then transmitted through glass substrate 122 and polarizing unit 121.

Figure 2:
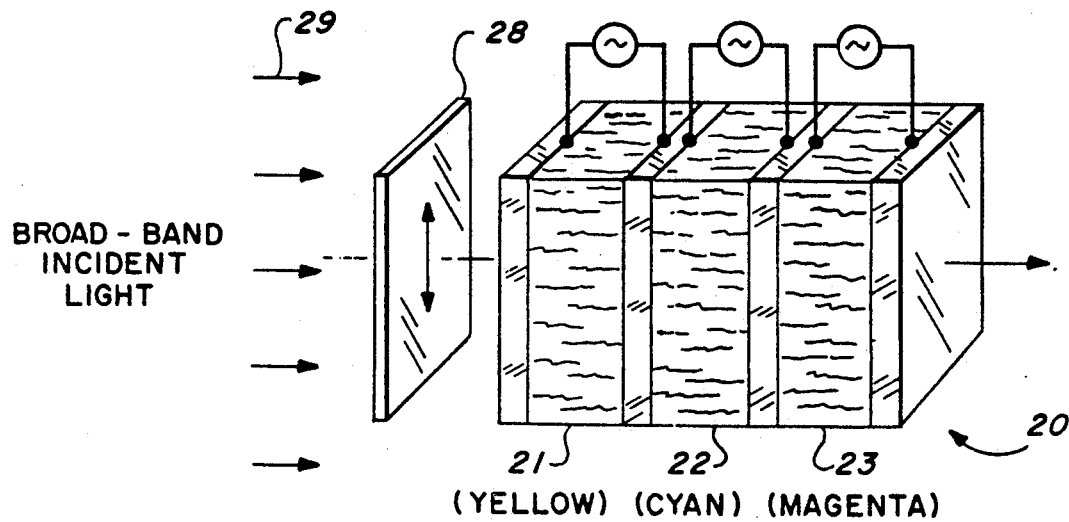
FIG. 2 is a diagram of an electronic color filter using subtractive color mixture via three stacked guest/host cells with yellow, cyan, and magenta dichroic guest dyes.

Referring next to FIG. 2, the fundamental elements of the present invention, the electronically-controlled subtractive color filter 20, are illustrated. These fundamental elements include three guest/host liquid crystal cells each containing a different dichroic guest dye {typically a magenta dye (−G) cell 23, a cyan dye (−R) cell 22 and a yellow dye (−B) cell 21} and aligned in serial registration along with associated structural and optical components. The dichroic dye guest materials are attached to the liquid crystal host molecules in such a manner that, as the host molecular orientation aligns with respect to the applied electric field, so does the dye guest. The guest/host medium is contained between glass or plastic polymer plates and sealed by epoxy or thermoplastics. Depending upon the cell surface alignment and the liquid crystal materials used, the resulting guest/host medium can be one of several types: a) the single polarizer type (shown in FIG. 2); b) the White-Taylor mode type; c) the phase change guest/host type; or d) the positive contrast negative anisotropic dielectric type. Guest/host medium types b, c, and d do not require a polarizer between the guest/host cell(s) and incident light, whereas type a requires a polarizing unit 21 oriented along the same direction as the liquid crystal host direction. The guest/host liquid crystal cells can be constructed with positive anisotropic liquid crystal materials such that the liquid crystal guest/host cells are selectively spectrally absorbing in the off state and become optically clear as a voltage is applied to the cell. The host liquid crystal material may be of the nematic, cholesteric, or smectic types. For positive anisotropic nematic and smectic hosts, a homogeneous molecular alignment to the cell surfaces is preferred. The guest/host liquid crystal cells can also be constructed with negative nematic anisotropic hosts and homeotropic molecular alignment. The guest host liquid crystal cells would then be optically clear in the off state and selectively spectrally absorbing in the on state. These host materials generally have higher voltage requirements and are not as readily available as "positive" nematic materials.

FIG. 2 also illustrates the basic principles of operation of the electronically controlled subtractive color filter. As can be seen, broad-band incident light 29 from a broad-band source is first passed through a polarization layer and then sequentially through the three sequentially aligned guest/host liquid crystal cells 20. Depending upon the guest dyes utilized and the voltage applied to each cell, the chromaticity (color) and luminance of the light emerging from the sequentially-aligned guest/host cells 20 can be completely controlled.

Figures 3A, 3B:
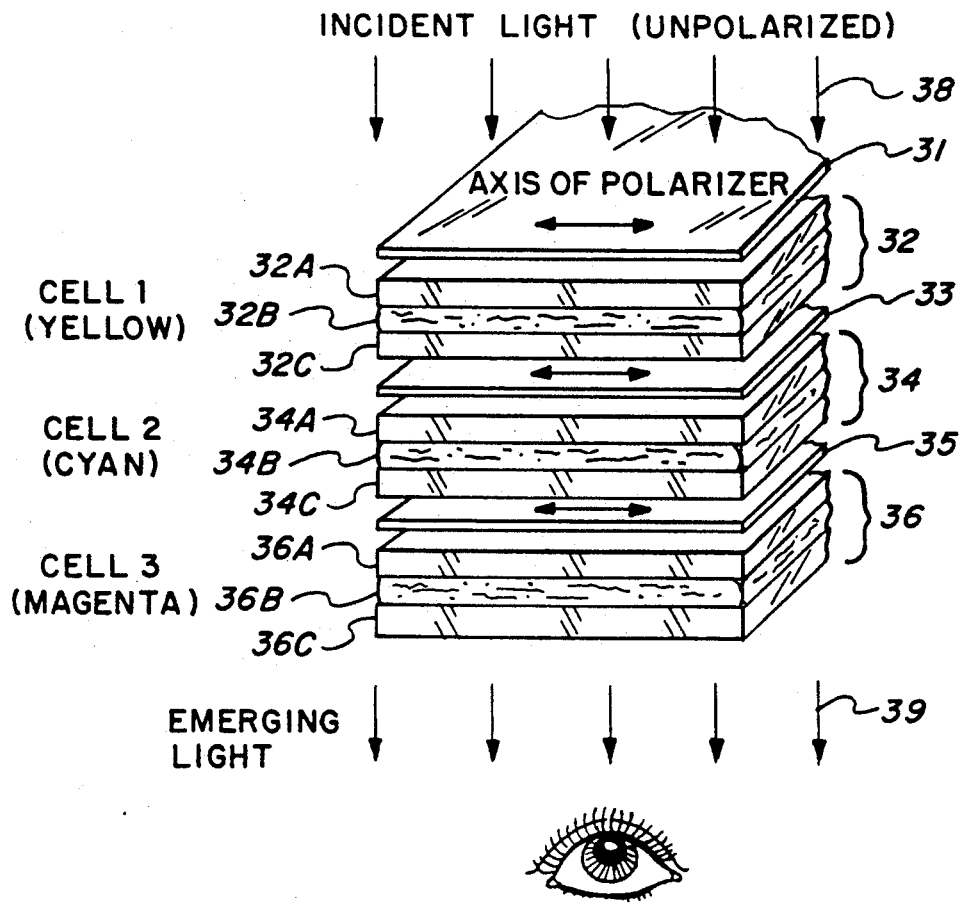
FIGS. 3A and 3B illustrate the control of color generation by an electronic subtractive color filter for the colors red, green, blue, and yellow, respectively.

Referring next to FIG. 3A and FIG. 3B, wherein anisotropic guest host dye cells with homogeneous molecular alignment are stacked, the operation of an electronically controlled subtractive color filter so as to produce the colors red, green, blue, and yellow, respectively, is illustrated. Incident (white and unpolarized) light 38 impinges on polarizing plate 31 and is transmitted therethrough to impinge on cell 1 32 having yellow dye material incorporated therein. Cell 1 32 includes a first glass substrate 32A and a second glass substrate 32C enclosing guest/host medium 32B. The light transmitted through cell 1 32 is transmitted through polarizing plate 33 having an axis of polarization parallel to the axis of polarization of polarizing plate 31. After transmission through polarizing plate 33, the light is transmitted through cell 2 34. Cell 2 34 has cyan dye material incorporated therein. Cell 2 34 is comprised of glass substrate 34A and glass substrate 34C enclosing guest/host medium 34B. The light transmitted through cell 2 34 is transmitted through polarizing plate 35, polarizing plate 35 having an axis of polarization parallel to the axis of polarization of polarizing plate 31. The light transmitted through polarizing plate 35 is applied to cell 3 36. Cell 3 36 has a magenta dye incorporated therein and has glass substrate 36A and glass substrate 36C enclosing guest/host medium 36B. The light transmitted though cell 3 36 is the emerging light 39 which will be polarized. (It will be clear that cell 1 32, cell 2 34, and cell 3 36 each can have a multiplicity of independently addressable pixel points, the pixel points for each cell aligned with related points for the other two cells.) Referring next to FIG. 3B, the configuration of the filter 30 to provide selected colors is shown. When cell 1 32 (with yellow dye) is off or absorbing, cell 2 34 (with cyan dye) is on or transmitting and cell 3 36 (with magenta dye) is off or absorbing, then the transmitted light will be red. FIG. 3B illustrates the liquid crystal cell states that provide green, blue and yellow emerging light. It will be clear that the configurations and colors illustrated in FIG. 3B constitute only a limited set of the colors and luminance gradations achievable with the present invention. Also note that the subtractive color filter construction shown in FIG. 3A (as well as FIGS. 4 and 5) contains a polarizer behind each component guest/host liquid crystal cell. This particular type of filter construction has been found to operate effectively for direct-view display applications in which a wide viewing angle is desired. The polarization of light prior to passage through each cell minimizes the effects of molecular birefringence in each cell and resulting chromatic shifts when viewed off-axis. The off-axis chromatic shifts resulting from molecular birefringence can alternately be minimized or eliminated by the use of liquid crystal host and dye guest materials possessing very low molecular birefringence, thereby providing good off-axis color performance and higher luminance throughput than is possible by the use of a maximum of one polarization layer. The effects of molecular birefringence and viewing parallax are of no consequence in projection applications of the electronic subtractive color filter.

The preferred embodiment and principles of operation of the basic subtractive color filter of the present invention having been described above, the embodiment(s) of several forms of full-color information display devices (as well as a unique application for electronic spectral shaping of light sources), which employ the electronic subtractive color filter as a fundamental element, can now be considered. Six embodiments of the present invention will be described. The first three embodiments utilize the electronic subtractive color filter as an integral component which is coupled to a monochromatic image forming source, thereby imparting full color capability to an otherwise monochromatic display device. The last three embodiments incorporate the function of image formation within the color filter stack itself, enabling the creation of both direct-view and projection-mode full-color information displays of either high or low resolution with the simple addition of a broad-band source of illumination. Prior reference to the use of subtractive color mixture, at least in theory or concept, has been mentioned within the context of potential application to direct-view, full-color information displays (T. Uchida, "Color LCDs: Technological Developments", *Japan Display*, 1983, pp. 202–205). However, in this reference it is stated that subtractive color technology is potentially suitable only for low-resolution, direct-view display applications, and that only the active-matrix addressed liquid crystal color matrix display (as described in FIG. 1B) is promising for practical use. This conclusion is in direct contradiction to the present patent disclosure, wherein the basic construction and principles of operation of a practical, electronically-controlled subtractive color filter are described in detail and the preferred embodiment(s) for six information display applications of the present invention are described.

Figure 4B:
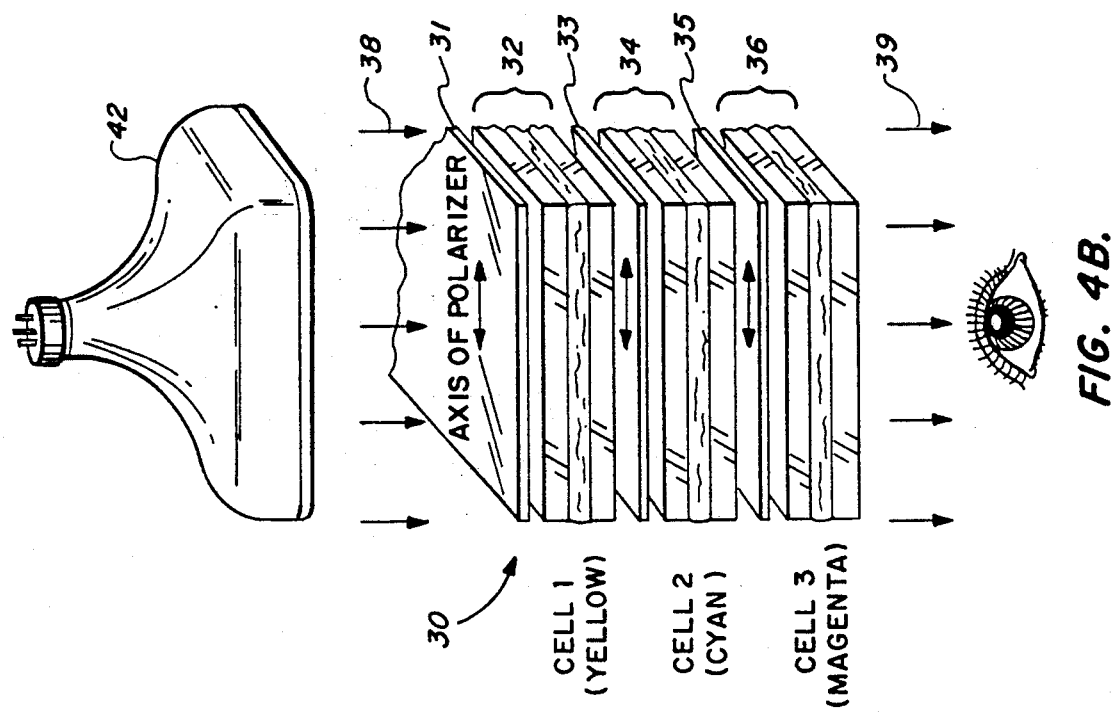
FIG. 4B is a diagram of an electronic subtractive color filter coupled to a broad-band, light-emitting image source to create a dynamic information display with full-color capability.
Figure 4A:
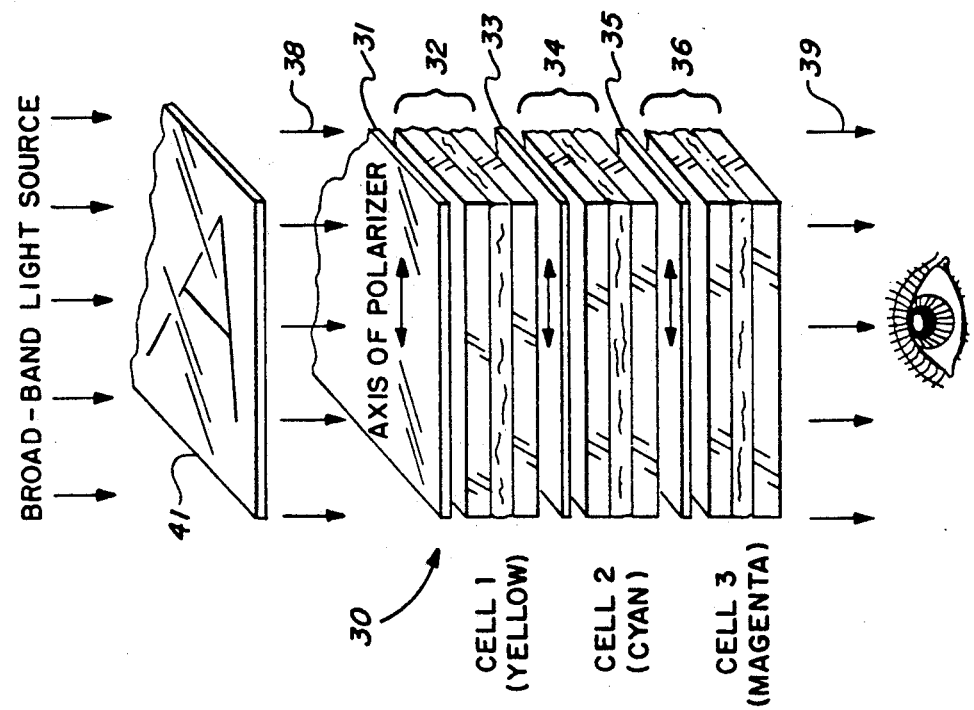
FIG. 4A is a diagram of an electronic subtractive color filter coupled to a symbol or character mask to create a static information display with full-color capability.

The first embodiment of the present invention is depicted in FIG. 4A, wherein the electronic subtractive color filter 30 receives light from a broad-band source passing through a static alphanumeric character or symbol mask 41 before being transmitted through the filter 30. In this configuration, the present invention serves to impart full color control to an otherwise monochromatic display of information. This embodiment is particularly useful for illuminated annunciators and control actuators (e.g., push-buttons) with illuminated legends, where the addition of color coding can provide supplementary information to the static image.

A second and related embodiment of the electronic subtractive color filter receives light from the source of illumination and controls the color temperature or otherwise shapes the spectrum of the source of illumination. This embodiment is particularly applicable to aircraft cockpit panels and ship-board control panels, where it is highly desirable to maintain a constant color appearance of light sources and illuminated annunciators under all ambient lighting and panel dimming conditions. In this manner, the inherent decrease in color temperature associated with the voltage-controlled dimming of tungsten light sources can be offset or compensated for by the present invention. Within this context, the electronically-controlled subtractive color filter can provide automatic spectral shaping of cockpit light sources so as to render them night-vision-goggle compatible. The present invention thus permits the spectral output characteristics of sources of illumination to be automatically switched or optimized for both daytime and night/night-vision-goggle compatible operations.

The third embodiment of the present invention is illustrated in FIG. 4B, in which the electronic subtractive color filter is placed between a broad-band, light-emitting image source (e.g., a monochrome cathode ray tube) 42 and an observer. In this implementation, the image source 42 provides dynamic, monochromatic image generation and the subtractive color filter imparts color to the image as it passes through the stack of guest/host liquid crystal cells 30. The most basic implementation of this third embodiment would provide only for switching the color of the entire image. Multiple colors within the same image would not be possible, and therefore the device would not be suitable for color video applications. However, the electronic subtractive color filter can be operated in a frame-sequential mode such that red, green, and blue image components are produced sequentially in time and integrated by the observer's eyes. This mode of operation would allow a complete multi-color image to be generated and is potentially suitable for color video imaging. The concepts of temporal color synthesis and the principle of frame-sequential color mixture, as well as the disadvantages of such an approach to color display development, have been previously discussed above.

Figure 5:
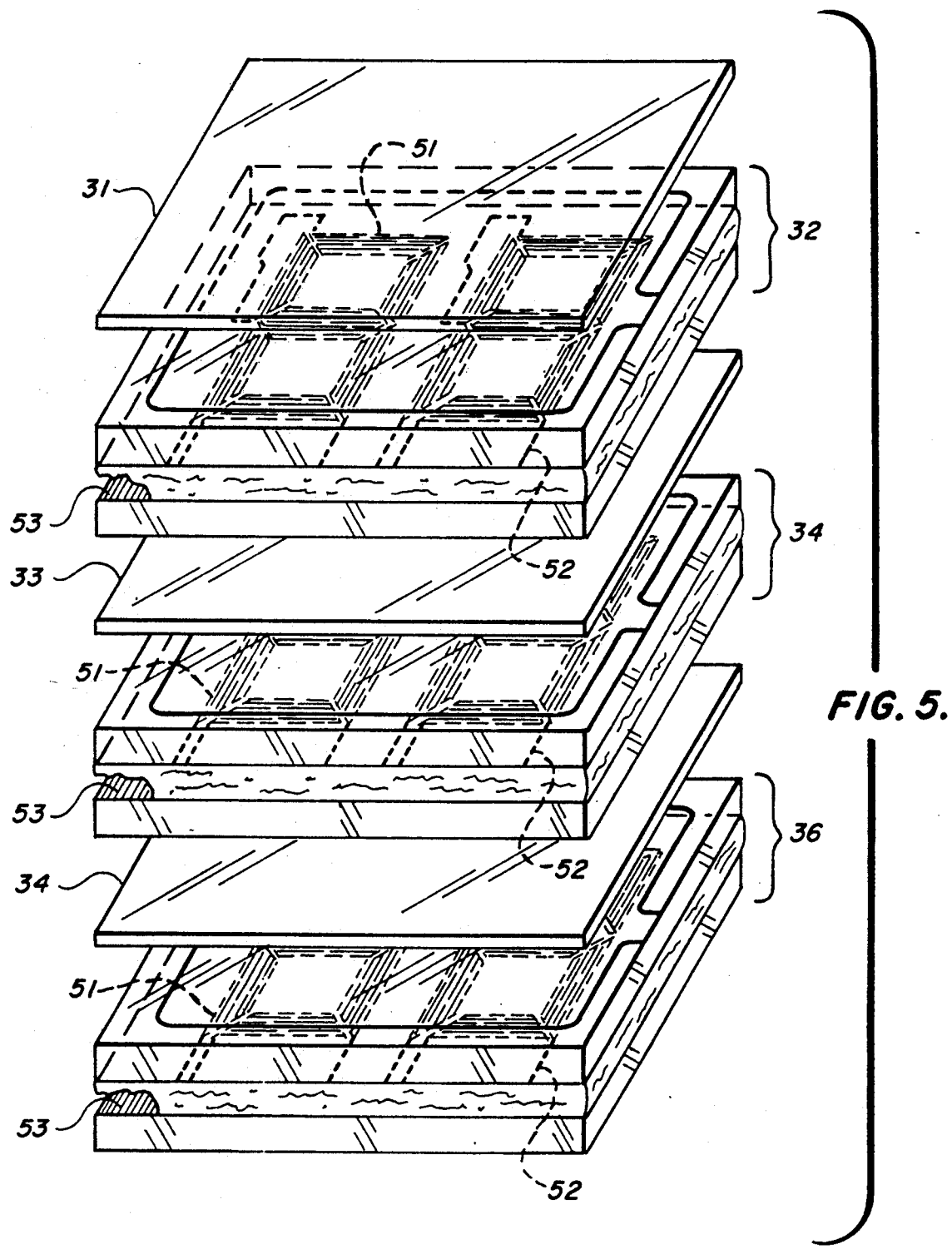
FIG. 5 shows a full-color alphanumeric display constructed with an integral electronic subtractive color filter.

Referring next to FIG. 5, a fourth embodiment of the present invention comprising a direct-view, low-resolution color display, in which the image forming source is integral to the electronic subtractive color filter, is shown. The basic color filter unit is similar to that described in FIG. 3 wherein three aligned polarizing plates 31, 33 and 35 and three cells 32, 34 and 36, the cells each including glass substrates enclosing a guest-/host medium, control the transmission of light therethrough. In the present embodiment, an image is formed via patterned transparent electrodes 51 deposited on one of the glass (or plastic) plates of each guest/host liquid crystal cell. Conducting leads 52 are used to couple the electrodes 51 to a voltage source (not shown). The other plate of each cell contains a simple backplane electrode 53. When a voltage is imposed across each cell, the liquid crystal material and guest dichroic dye switch only in the area under the patterned electrode. In order to achieve full-color, the three cells must be carefully aligned such that filtered light transmitted through the patterned areas of one cell sequentially passes through the corresponding patterned areas of the next sequential cell. A potential problem for this implementation occurs with respect to off-axis viewing or parallax. Image mis-registration due to parallax between layers of the three-cell stack can be minimized or functionally eliminated by the use of very thin glass or plastic plates for guest/host liquid crystal cell 32, 34 and 36 construction. Further reductions in the thickness of the stack of liquid crystal cells can be achieved by constructing the complete subtractive color filter using four plates, with patterned electrodes being deposited on both surfaces of one of the two inner plates (this also simplifies cell alignment). Moreover, low birefringence liquid crystal materials can be used such that the display can be constructed with a single polarizer. An alternative approach for eliminating parallax in stacked cells is to use a fiber-optic plate as the cell surface closest to the observer. The fiber-optic plate "channels" the light passing through the stack of cells and prevents the observer from looking obliquely through the cells, thereby eliminating or minimizing image mis-registration due to parallax.

The preferred embodiment of the electronic subtractive color filter for direct-view, low-resolution color display applications, as described in the preceding paragraph, is particularly suitable for full-color alphanumeric and low-resolution graphics applications. A major advantage of this technical approach is elimination of the need for high pixel density (which is required to accommodate spatial color synthesis) resulting in a relatively simple, low-cost, full-color information display for those applications requiring only low to moderate image resolution. The low pixel density required for this display implementation allows the use of simple multiplexed pixel addressing and voltage drive techniques.

Figure 6:
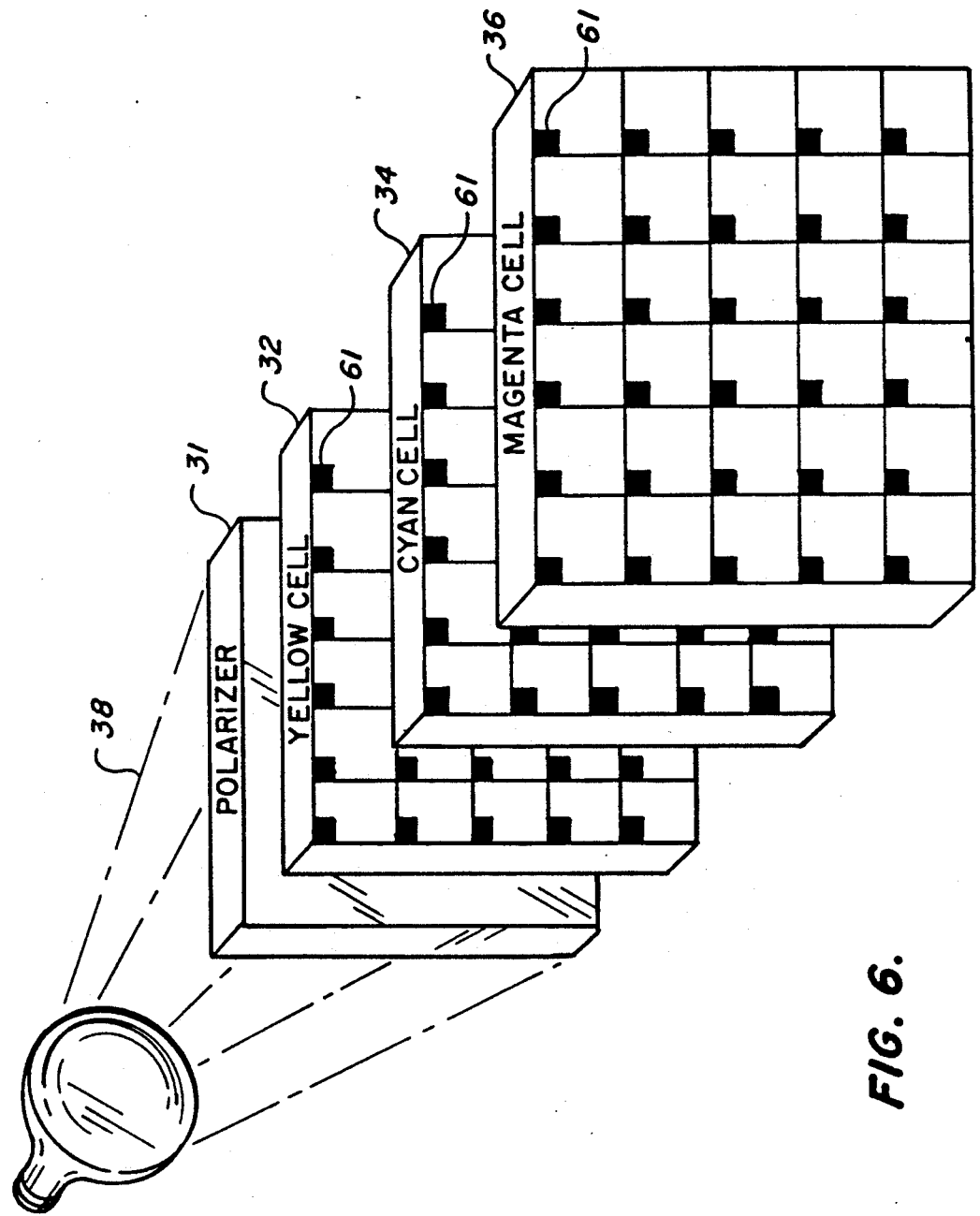
FIG. 6 is a diagram of a 3-cell electronic subtractive color filter using a thin-film transistor active-matrix substrate in each cell to produce a full-color, high-resolution information display.

Referring next to FIG. 6, a fifth embodiment of the present invention suitable for direct-view, high-resolution, full-color display applications is shown. FIG. 5 illustrates this embodiment, in which each cell 32, 34 and 36 of the electronic subtractive color filter 30 contains a high-density matrix of picture elements and control the transmission of impinging broad band light therethrough. In turn, each picture element contains an integral sample-and-hold device (e.g., a thin-film transistor) 61 along with the address conducting leads (not shown). This active-matrix addressed subtractive color display has many construction features in common with the active-matrix addressed liquid crystal color matrix display depicted in FIG. 1B. However, the major advantage of this embodiment of the present invention is the much higher full-color image resolution achievable with the electronic subtractive color filter as compared to a spatial additive approach in which at least three primary colors (R,G,B) must be represented in the image plane for each image point. As with the low-resolution, direct view configuration described with reference to FIG. 5, parallax is a potential problem in high-resolution, direct-view applications. The approaches for eliminating or minimizing parallax described for the previous embodiment are also applicable to the present high-resolution configuration.

Figure 7:
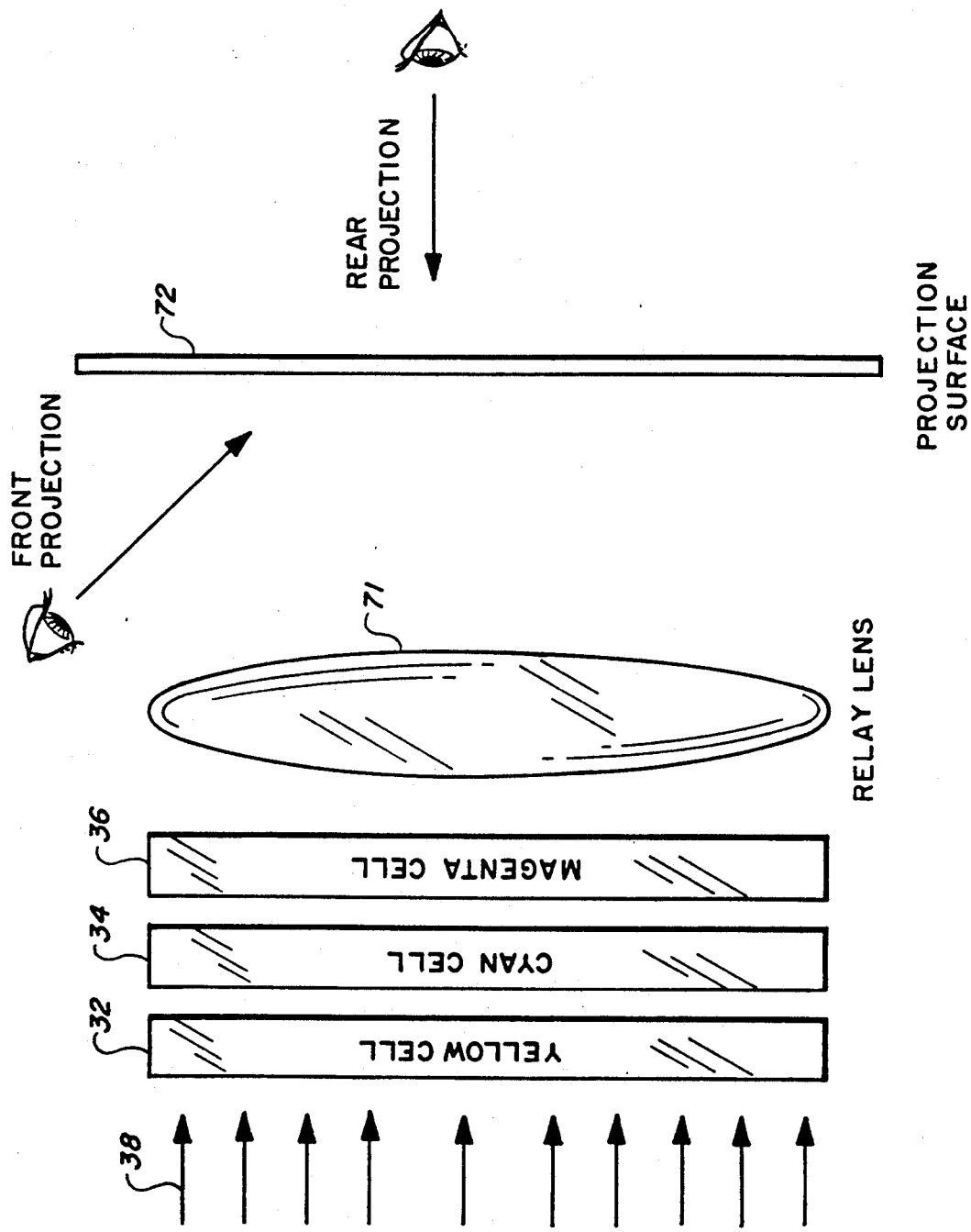
FIG. 7 is a diagram of an active-matrix addressed electronic subtractive color filter coupled to a projection optical system to produce a full-color, high-resolution projection display in both a front-projection and rear-projection configuration.

Referring next to FIG. 7, the final embodiment of the present invention described herein utilizes the electronic subtractive color filter 30 as an image-forming, full-color, projection light valve. Image generation by the color filter 30 in response to incident radiation 38 can be for a low resolution image, in which case a direct multiplexed addressing technique is preferred, or for a high resolution image, in which case an active-matrix addressed configuration for pixel addressing in each guest/host liquid crystal cell 30 is typically preferred. FIG. 7 illustrates a high-resolution implementation of the projection-mode embodiment of the present invention. In this embodiment, the electronic subtractive color filter 30 functions as a full-color image-forming source which, when coupled to a broad-band source of illumination 38 and relay lens 71 arrangement, is capable of projecting a full-color image on either a front- or rear-projection screen surface 72. The projection mode embodiment is particularly suitable for very high-resolution, full-color, large area display systems as well as for head-up display (HUD) and helmet-mounted display (HMD) applications. For a HUD system, the full color image is collimated and then projected onto a transparent optical combiner which, via reflection of the projected image, superimposes the projected image with other visual images passing through the optical combiner. The HMD implementation is very similar to the HUD configuration, with the exception that the image source and optical combiner are now incorporated within a helmet worn by the display observer. Because both HUD and HMD systems require extremely high image resolution, the present invention is uniquely suited to provide the requisite resolution combined with full color capability for such devices. The capability for extremely high-resolution, full-color image generation in the projection mode of the present invention is primarily a function of the fundamental property of the electronic subtractive color filter which yields full-color control at each individual picture element. Moreover, parallax and molecular birefringence effects are of little or no consequence in the projection-mode embodiment as a completely registered image is passed through the stack of guest/host liquid crystal cells and then projected onto a remote viewing surface, thereby affording the observer no opportunity to view the image source from an off-axis perspective.

2. Operation of the Preferred Embodiment

The present invention employs a subtractive approach to color generation which enables full color control to be achieved at each individual image pixel or segment. When used as an electronic color filter, such that an image is formed by some other associated image forming device {e.g., a cathode-ray tube (CRT) or patterned image transilluminated by a light source}, the present invention can control the spectral emissions from the image forming source or impart color to an otherwise achromatic or monochromatic formed image.

The subtractive liquid crystal displays of the present invention rely on the properties of the filter materials. The filter materials have controllable absorption characteristics, each of the three filter elements influencing (i.e., absorbing) radiation in a preselected portion of the spectrum and having a negligible influence on the remaining portion of the transmitted spectrum. By appropriate selection of the filter materials, the color components in a color chart combination, determined by the filter characteristics, can be achieved at each pixel point when the impinging radiation (transmitted by the pixel filter) has the required spectral components. The directional nature of the transmitted radiation can be reduced, when a wider viewing angle is desirable, by placing a diffusion plate in front of the transmitted radiation.

As was previously discussed, the invention consists of a novel approach to developing an electronically-controlled color filter and several implementations of full-color information displays which incorporate this electronic color filter as a critical element. The unique and fundamental aspect of this color filter is the utilization of a subtractive method of color synthesis, rather than the spatial or temporal additive techniques which characterize existing switchable color filters and related color display technology.

The present invention solves several of the problems inherent to full-color display technology by employing a subtractive, rather than an additive approach to color mixture. Using subtractive color mixture, a full-color information display is created by using a single broad-band light or image source which passes emitted light through a stack composed of three thin liquid crystal cells. Each cell contains a different dichroic dye in a guest/host arrangement with the liquid crystal medium. Typically, magenta (M), cyan (C), and yellow (Y) dichroic dyes are used, which are the respective color complements of the R, G, and B primaries of additive color systems, however other dye combinations can be employed. The dichroic guest/host liquid cells each constitute an electronic color filter, which is switchable by the application of an appropriate voltage(s) across the two plates of the cell. In one extreme state, the cell simply passes all spectral components of light, while in the other extreme state the spectral composition of light passing through the cell is altered by the particular dichroic dye such that the complementary color of the dye is blocked or subtracted from passage through the cell. Applied voltage levels in between those required to produce the extreme states result in gradations of the spectral shaping produced by the cell. Since spectral components of a broad-band source of light are subtracted ($-R$, $-G$, $-B$) rather than added ($+R$, $+G$, $+B$), a full-color electronic filter can be constructed by stacking three cells with an appropriately selected dye for each cell. Given a broad-band light source and a three-cell stack incorporating a pixel addressing mechanism in each of the cells, a full-color information display is created with complete color control at each individual pixel. Alternatively, given a broad-band image forming source (i.e., a monochromatic display emitting white light) and a three-cell stack mounted in front of the imaging device, a full-color information display is created in which the monochromatic image forming source controls image construction or detail and the three-cell liquid crystal stack serves as an electronically controlled color rendering filter.

The present invention offers several advantages over existing approaches to the development of full-color information displays. First, the creation of a color display which uses a subtractive color mixture enables full color control at every display pixel, eliminating degradations of potential resolution inherent to spatial additive approaches which require separate R, G, and B pixels to form each full-color image element. Second, a full-color low resolution display can be created without the high cost associated with spatial additive color display technologies which require a relatively high density (i.e., resolution) of primary color pixels just to accomplish the color mixture or synthesis function. Third, a color display using an electronically controlled color filter as described herein does not require frame-sequential operation and is thus not prone to the visual flicker and color image smear resulting from temporal color synthesis. Finally, the invention offers great flexibility for the design of color display systems used in a wide variety of applications, and can be configured as a simple electronic color filter for modifying the color of a monochromatic light or image source or as either a low- or high-resolution full-color information display.

With respect to the liquid crystal/dye components used in the liquid crystal cells, suitable materials are commercially available, e.g., from EM Industries Inc., Advanced Chemical Division, 5 Skyline Drive, Hawthorne, N.Y. 10532.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the present invention.

What is claimed is:

1. A color filter for controlling transmission of applied light to provide a selected output color signal, said color filter comprising:
   a first filter including
      a first dye material cell having an absorption coefficient in a first preselected spectral range, said first dye material absorption coefficient determined by an electric field strength applied thereto,
      first electrodes positioned to apply an electric field to said first dye material having an electric field strength determined by a first voltage applied across said first electrodes;
   a first neutral density polarizer positioned between said applied light and said first filter;
   a second filter including
      a second dye material cell having an absorption coefficient in a second preselected spectral range, said second dye material absorption coefficient determined by an electric field strength applied thereto,
      second electrodes positioned to apply an electric field to said first dye material having an electric field strength determined by a second voltage applied across said second electrodes;
   a second neutral density polarizer positioned between said first filter and said second filter, said second polarizer being aligned with said first polarizer; a third filter including
      a third dye material cell having an absorption coefficient in a third preselected spectral range determined by an electric field strength applied thereto,
      third electrodes positioned to apply an electric field to said third dye material having an electric field strength determined by a third voltage applied across said third electrodes;
   a third neutral density polarizer coupled between said second filter and said third filter, said third polarizer aligned with said first polarizer; and
   voltage means for providing said first, second and third voltages resulting in said selected output color signal, wherein said color filter includes a multiplicity of sets of aligned first, second and third cells; each set of aligned cells controlling transmission of light in a preselected region of said filter, each of said preselected display regions being a pixel region, said transmitted light providing a projection display.

2. The color filter of claim 1 wherein said first, said second, and said third dye material are Guest-Host liquid crystal materials.

3. The color filter of claim 2 wherein said first, said second, and said third plurality of liquid crystal cells have a predetermined orientation with respect to said first polarizer.

4. The color filter of claim 3 wherein said color filter is one of a multiplicity of pixels of a display, wherein each pixel is capable of being addressed independently.

5. The color filter of claim 3 wherein said color filter is one of a multiplicity of alpha-numeric segments of a display.

6. A electronically controlled color display comprising;
   a broad band source of radiation; and
   color filter means responsive to electronic signals for controlling transmission of light therethrough, said filter means including;
      a first plurality of liquid crystal cells, each of said first liquid crystal cells controlling transmission of light through a selected portion of said color display, said liquid crystal cell having a first dye material incorporated therein, each of said first liquid crystal cells having electrodes coupled thereto for applying an electric field across said liquid crystal and first dye material, each said first liquid crystal cells absorbing a first spectral component of said transmitted light by an amount determined by an electric field applied thereto, said first spectral component determined by said first dye material;
      a first neutral density polarizer positioned between said source of radiation and said first plurality of cells;
      a second plurality of liquid crystal cells with a second dye material incorporated therein, each of said second plurality of liquid crystal cells being aligned with a one of said first plurality of liquid crystal cells, each of said second plurality of liquid crystal cells controlling transmission of a second spectral component therethrough, wherein each of said first liquid crystal cells and said aligned second liquid crystal cell is a pixel of a matrix color display; and
      a second neutral density polarizer aligned with said first polarizer and positioned between said first cells and said second cell; and
   apparatus for using transmitted spectral components in a projection display.

7. The color display of claim 6 wherein said first and said second plurality of liquid crystal cells have a predetermined orientation with respect to said first polarizer.

8. A electronically controlled color display comprising;
   a broad band source of radiation;
   color filter means responsive to electronic signals for controlling transmission of light therethrough, said filter means including;
      a first liquid crystal cell, said first liquid crystal cells controlling transmission of light through said color display, said first liquid crystal cell having a first dye material incorporated therein, said first liquid crystal cell having electrodes coupled thereto for applying an electric field across said liquid crystal and first dye material, said first liquid crystal cell absorbing a first spectral component of said transmitted light by an amount determined by an electric field applied thereto, said first spectral component determined by said first dye material, a first polarizer aligned between said source of radiation and said first liquid crystal cell;

a second liquid crystal cell with a second dye material incorporated therein, said second liquid crystal cell controlling transmission of a second spectral component therethrough; and a second polarizer aligned with said first polarizer and positioned between said first and said second liquid crystal cell; and activation means for activating said first liquid crystal cell and said second liquid crystal cell in a frame sequential mode of operation, wherein color components of said broad band source of radiation resulting from said frame sequential mode of operation are integrated by an observer.

9. The color display of claim 8 wherein said first liquid crystal cell and said second liquid crystal cell have predetermined orientation with respect to said first polarizer.

10. The electronically controlled color display of claim 8 wherein said broad band source of radiation has images imposed thereon, said images synchronized with said activation means.

11. An electronically controlled color display comprising;

a broad band source of radiation;

color filter means responsive to electronic signals for controlling transmission of light therethrough, said filter means including;

a first liquid crystal cell, said first liquid crystal cells controlling transmission of light through said color display, said first liquid crystal cell having a first dye material incorporated therein, said first liquid crystal cell having electrodes coupled thereto for applying an electric field across said liquid crystal and first dye material, said first liquid crystal cell absorbing a first spectral component of said transmitted light by an amount determined by an electric field applied thereto, said first spectral component determined by said first dye material, a first polarizer positioned between said broad band source of radiation and said first liquid crystal cell;

a second liquid crystal cell with a second dye material incorporated therein, said second liquid crystal cell controlling transmission of a second spectral component therethrough; and a second polarizer aligned with said first polarizer and positioned between said first and said second liquid crystal cell; and activation means for activating said first liquid crystal cell and said second liquid crystal cell, wherein said activation means is responsive to said broad band source of radiation for compensating for changes in a spectral output of said broad band source of radiation.

12. The color display of claim 11 wherein said first liquid crystal cell and said second liquid crystal cell have a predetermined orientation with respect to said first polarizer.

13. The color display of claim 11 wherein said color filter means further includes:

a third liquid crystal cell with a third dye material incorporated therein, said third liquid crystal cell controlling transmission of a third spectral component therethrough; and a third polarizer aligned with said first polarizer and positioned between said second and said third liquid crystal cell.

* * * * *

UNITED STATES PATENT AND TRADEMARK OFFICE
CERTIFICATE OF CORRECTION

PATENT NO. : 5,032,007
DATED : July 16, 1991
INVENTOR(S) : Louis D. Silverstein and Anthony J. Bernot It is certified that error appears in the above-identified patent and that said Letters Patent is hereby corrected as shown below:

Column 11, line 35, should read "thereto, and"

Column 11, line 47, should read "thereto, and"

Column 11, line 49, cancel "first" and insert --second--

Column 11, line 59, should read "thereto, and"

Column 12, line 9, cancel "material" insert --materials--

Column 12, line 21, cancel "A" insert --An--

Column 12, line 25, should read "said color filter"

Column 12, line 30, should read "said first liquid"

Column 12, line 30, cancel "cell" insert --cells--

Column 12, line 61, cancel "A" insert --An--

UNITED STATES PATENT AND TRADEMARK OFFICE
CERTIFICATE OF CORRECTION

PATENT NO. : 5,032,007

DATED : July 16, 1991

INVENTOR(S) : Louis D. Silverstein and Anthony J. Bernot

It is certified that error appears in the above-identified patent and that said Letters Patent is hereby corrected as shown below:

Column 12, line 65, should read "said color filter"

Column 12, line 68, cancel "cells" insert --cell--

Column 13, line 28, should read "have a predetermined"

Column 13, line 41, cancel "cells" insert --cell--

Column 14, line 40, cancel "cell" insert --cells--

Signed and Sealed this

Twenty-fourth Day of November, 1992

Attest:

DOUGLAS B. COMER

*Attesting Officer*   *Acting Commissioner of Patents and Trademarks*